United States Patent
Fernando et al.

(10) Patent No.: US 12,364,289 B2
(45) Date of Patent: *Jul. 22, 2025

(54) ELECTRICALLY HEATED AEROSOL GENERATING SYSTEM AND METHOD

(71) Applicant: Philip Morris USA Inc., Richmond, VA (US)

(72) Inventors: Felix Fernando, Berkshire (GB); Franck Pourrat, Montlebon (FR); Jean-Pierre Cordey, Cheseaux (CH)

(73) Assignee: PHILIP MORRIS USA INC., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,156

(22) Filed: Nov. 16, 2023

(65) Prior Publication Data

US 2024/0081422 A1 Mar. 14, 2024

Related U.S. Application Data

(63) Continuation of application No. 17/568,364, filed on Jan. 4, 2022, now Pat. No. 11,832,654, which is a
(Continued)

(30) Foreign Application Priority Data

Mar. 14, 2008 (EP) .................................. 08250885

(51) Int. Cl.
*A24F 40/50* (2020.01)
*A24F 40/40* (2020.01)
(Continued)

(52) U.S. Cl.
CPC .............. *A24F 40/50* (2020.01); *A24F 40/40* (2020.01); *A24F 40/90* (2020.01); *H02J 7/0024* (2013.01);
(Continued)

(58) Field of Classification Search
CPC ........ H02J 7/345; H02J 7/0048; H02J 7/0024; H02J 7/0071; H05B 3/20; A24F 40/40; A24F 40/90; A24F 40/50
(Continued)

(56) References Cited

U.S. PATENT DOCUMENTS

| 1,771,366 A | 7/1930 | Wyss et al. |
| 1,968,509 A | 7/1934 | Tiffany |

(Continued)

FOREIGN PATENT DOCUMENTS

| CA | 1202378 A | 3/1986 |
| CN | 87/104459 A | 2/1988 |

(Continued)

OTHER PUBLICATIONS

Japanese Office Action dated Jul. 27, 2015 for corresponding Application No. P2014-114638.
(Continued)

*Primary Examiner* — Jimmy Chou
(74) *Attorney, Agent, or Firm* — Harness, Dickey & Pierce, P.L.C.

(57) ABSTRACT

An electrically heated aerosol generating system for receiving an aerosol-forming substrate includes at least one heating element for heating the substrate to form the aerosol and a power supply for supplying power to the at least one heating element. The power supply includes a voltage source, two or more supercapacitors, and switches between the voltage source and the two or more supercapacitors. The switches are arranged so that, during a charging mode, the supercapacitors are connected so as to be charged by the voltage source and, during a heating mode, the supercapacitors are connected so as to discharge through the at least one heating element.

13 Claims, 4 Drawing Sheets

Related U.S. Application Data continuation of application No. 16/552,394, filed on Aug. 27, 2019, now Pat. No. 11,224,255, which is a continuation of application No. 15/234,545, filed on Aug. 11, 2016, now Pat. No. 10,398,170, which is a continuation of application No. 12/404,788, filed on Mar. 16, 2009, now Pat. No. 9,439,454.

(51) Int. Cl.
*A24F 40/90* (2020.01)
*H02J 7/00* (2006.01)
*H05B 3/20* (2006.01)
*H02J 7/34* (2006.01)

(52) U.S. Cl.
CPC .............. *H02J 7/0071* (2020.01); *H05B 3/20* (2013.01); *H02J 7/0048* (2020.01); *H02J 7/345* (2013.01)

(58) Field of Classification Search
USPC ........................................................ 392/403
See application file for complete search history.

(56) References Cited

U.S. PATENT DOCUMENTS

| | | |
|---|---|---|
| 2,057,333 A | 10/1936 | Guibert |
| 2,104,266 A | 1/1938 | McCormick |
| 2,406,275 A | 8/1946 | Wejnarth |
| 2,442,004 A | 5/1948 | Hayward-Butt |
| 2,971,039 A | 2/1961 | Western |
| 2,974,669 A | 3/1961 | Ellis |
| 3,200,809 A | 8/1965 | Suchowolec |
| 3,255,760 A | 6/1966 | Selker |
| 3,258,015 A | 6/1966 | Ellis et al. |
| 3,280,819 A | 10/1966 | Weeks |
| 3,280,840 A | 10/1966 | Shirey |
| 3,363,633 A | 1/1968 | Weber |
| 3,402,723 A | 9/1968 | Hu |
| 3,443,049 A | 5/1969 | Hoagland |
| 3,482,580 A | 12/1969 | Hollabaugh |
| 3,608,560 A | 9/1971 | Briskin et al. |
| 3,654,538 A * | 4/1972 | Gardberg ............... H02J 7/0034 361/84 |
| 3,738,374 A | 6/1973 | Bennett |
| 3,774,496 A | 11/1973 | Roach |
| 3,804,100 A | 4/1974 | Fariello |
| 3,875,476 A | 4/1975 | Crandall et al. |
| 3,889,690 A | 6/1975 | Guarnieri |
| 3,895,219 A | 7/1975 | Richerson et al. |
| 3,976,529 A | 8/1976 | Weichselbaum |
| 4,016,061 A | 4/1977 | Wasa et al. |
| 4,063,161 A * | 12/1977 | Pardis ...................... G01V 3/02 324/529 |
| 4,068,672 A | 1/1978 | Guerra |
| 4,077,784 A | 3/1978 | Vayrynen |
| 4,098,725 A | 7/1978 | Yamamoto et al. |
| 4,103,144 A | 7/1978 | Pizzarello et al. |
| 4,110,260 A | 8/1978 | Yamamoto et al. |
| 4,131,119 A | 12/1978 | Blasutti |
| 4,141,369 A | 2/1979 | Burruss |
| 4,164,230 A | 8/1979 | Pearlman |
| 4,193,411 A | 3/1980 | Faris et al. |
| 4,215,708 A | 8/1980 | Bron |
| 4,219,032 A | 8/1980 | Tabatznik et al. |
| 4,246,913 A | 1/1981 | Ogden et al. |
| 4,256,945 A | 3/1981 | Carter et al. |
| 4,259,970 A | 4/1981 | Green, Jr. |
| 4,303,083 A | 12/1981 | Burruss, Jr. |
| 4,319,591 A | 3/1982 | Keith et al. |
| 4,327,186 A | 4/1982 | Murata et al. |
| 4,355,222 A | 10/1982 | Geithman et al. |
| 4,393,884 A | 7/1983 | Jacobs |
| 4,405,963 A * | 9/1983 | Holtzman ................ H02H 7/16 361/275.3 |
| 4,407,971 A | 10/1983 | Komatsu et al. |
| 4,416,840 A | 11/1983 | Lee et al. |
| 4,431,903 A | 2/1984 | Riccio |
| 4,436,100 A | 3/1984 | Green, Jr. |
| 4,449,039 A | 5/1984 | Fukazawa et al. |
| 4,463,247 A | 7/1984 | Lawrence et al. |
| 4,467,165 A | 8/1984 | Kiuchi et al. |
| 4,475,029 A | 10/1984 | Yoshida et al. |
| 4,481,404 A * | 11/1984 | Thomas .................. F24C 14/02 219/393 |
| 4,488,335 A | 12/1984 | Fox et al. |
| 4,503,319 A | 3/1985 | Moritoki et al. |
| 4,505,282 A | 3/1985 | Cogbill et al. |
| 4,521,659 A | 6/1985 | Buckley et al. |
| 4,528,121 A | 7/1985 | Matsushita et al. |
| 4,549,905 A | 10/1985 | Yamaguchi et al. |
| 4,555,358 A | 11/1985 | Matsushita et al. |
| 4,562,337 A | 12/1985 | Lawrence |
| 4,570,646 A | 2/1986 | Herron |
| 4,580,583 A | 4/1986 | Green, Jr. |
| 4,621,649 A | 11/1986 | Osterrath |
| 4,623,401 A | 11/1986 | Derbyshire et al. |
| 4,634,837 A | 1/1987 | Ito et al. |
| 4,637,407 A | 1/1987 | Bonanno et al. |
| 4,659,912 A | 4/1987 | Derbyshire |
| 4,723,835 A * | 2/1988 | Franklin ............ G05D 23/1909 349/161 |
| 4,735,217 A | 4/1988 | Gerth et al. |
| 4,765,859 A | 8/1988 | Heath et al. |
| 4,771,796 A | 9/1988 | Myer |
| 4,776,353 A | 10/1988 | Lilja et al. |
| 4,789,767 A | 12/1988 | Doljack |
| 4,837,421 A | 6/1989 | Luthy |
| 4,846,199 A | 7/1989 | Rose |
| 4,848,376 A | 7/1989 | Lilja et al. |
| 4,874,924 A | 10/1989 | Yamamoto et al. |
| 4,877,989 A | 10/1989 | Drews et al. |
| 4,922,901 A * | 5/1990 | Brooks ............... A61M 16/109 131/273 |
| 4,933,830 A | 6/1990 | Sato et al. |
| 4,945,931 A | 8/1990 | Gori |
| 4,947,874 A * | 8/1990 | Brooks .................. A24F 40/50 131/194 |
| 4,947,875 A * | 8/1990 | Brooks ................. A61M 15/00 131/194 |
| 4,966,171 A | 10/1990 | Serrano et al. |
| 4,981,522 A | 1/1991 | Nichols et al. |
| 4,991,606 A | 2/1991 | Serrano et al. |
| 5,016,656 A | 5/1991 | McMurtrie |
| 5,040,552 A | 8/1991 | Schleich et al. |
| 5,045,237 A | 9/1991 | Washburn |
| 5,060,671 A * | 10/1991 | Counts .................... A24F 40/50 131/273 |
| 5,075,529 A | 12/1991 | Kudo |
| 5,076,296 A | 12/1991 | Nystrom et al. |
| 5,085,804 A | 2/1992 | Washburn |
| 5,093,894 A | 3/1992 | Deevi et al. |
| 5,095,921 A * | 3/1992 | Losee ..................... A24F 40/50 131/194 |
| 5,101,086 A | 3/1992 | Dion et al. |
| 5,139,594 A | 8/1992 | Rabin |
| 5,144,962 A * | 9/1992 | Counts .................... A24D 1/20 131/194 |
| 5,157,242 A | 10/1992 | Hetherington et al. |
| 5,179,966 A * | 1/1993 | Losee ..................... A24F 40/46 131/194 |
| 5,188,130 A | 2/1993 | Hajaligol et al. |
| 5,224,498 A | 7/1993 | Deevi et al. |
| 5,228,460 A | 7/1993 | Sprinkel et al. |
| 5,235,157 A | 8/1993 | Blackburn |
| 5,236,108 A | 8/1993 | House |
| 5,249,586 A * | 10/1993 | Morgan ................. A24F 40/46 131/194 |
| 5,261,424 A * | 11/1993 | Sprinkel, Jr. .......... A24F 40/51 392/386 |
| 5,268,553 A | 12/1993 | Shimoji |
| 5,269,327 A * | 12/1993 | Counts .................... A24F 40/30 131/194 |

(56) References Cited

U.S. PATENT DOCUMENTS

| | | | |
|---|---|---|---|
| 5,274,214 A | 12/1993 | Blackburn | |
| 5,285,050 A | 2/1994 | Blackburn | |
| 5,300,758 A * | 4/1994 | Rounbehler | G01N 30/84 |
| | | | 219/505 |
| 5,322,075 A * | 6/1994 | Deevi | A24F 40/46 |
| | | | 131/194 |
| 5,345,161 A * | 9/1994 | Zieve | H02M 3/135 |
| | | | 361/16 |
| 5,353,813 A | 10/1994 | Deevi et al. | |
| 5,369,723 A * | 11/1994 | Counts | A24D 1/20 |
| | | | 131/194 |
| 5,372,148 A | 12/1994 | McCafferty et al. | |
| 5,388,594 A * | 2/1995 | Counts | A24F 40/485 |
| | | | 131/194 |
| 5,396,911 A | 3/1995 | Casey, III et al. | |
| 5,408,574 A | 4/1995 | Deevi et al. | |
| 5,444,310 A * | 8/1995 | Kataoka | H05B 41/282 |
| | | | 315/205 |
| 5,479,948 A * | 1/1996 | Counts | A24F 40/42 |
| | | | 131/194 |
| 5,498,855 A * | 3/1996 | Deevi | A24F 40/46 |
| | | | 131/194 |
| 5,499,636 A | 3/1996 | Baggett, Jr. et al. | |
| 5,505,214 A * | 4/1996 | Collins | A24D 1/20 |
| | | | 131/194 |
| 5,514,630 A | 5/1996 | Willkens et al. | |
| 5,519,940 A | 5/1996 | Deevi et al. | |
| 5,530,225 A * | 6/1996 | Hajaligol | A24F 40/46 |
| | | | 131/194 |
| 5,568,035 A * | 10/1996 | Kato | H02M 3/07 |
| | | | 363/59 |
| 5,591,368 A | 1/1997 | Fleischhauer et al. | |
| 5,613,504 A * | 3/1997 | Collins | H05B 3/42 |
| | | | 131/194 |
| 5,613,505 A * | 3/1997 | Campbell | H05B 6/365 |
| | | | 131/194 |
| 5,665,262 A * | 9/1997 | Hajaligol | A24F 40/46 |
| | | | 131/194 |
| 5,666,977 A * | 9/1997 | Higgins | A24F 40/48 |
| | | | 131/194 |
| 5,666,978 A * | 9/1997 | Counts | A24D 1/20 |
| | | | 131/194 |
| 5,708,258 A * | 1/1998 | Counts | A24D 1/20 |
| | | | 131/194 |
| 5,730,158 A * | 3/1998 | Collins | A24D 3/17 |
| | | | 131/194 |
| 5,750,964 A * | 5/1998 | Counts | A24F 40/46 |
| | | | 131/194 |
| 5,761,058 A * | 6/1998 | Kanda | H02M 7/4835 |
| | | | 363/60 |
| 5,831,788 A | 11/1998 | Hofland | |
| 5,838,519 A | 11/1998 | Takizawa et al. | |
| 5,865,185 A * | 2/1999 | Collins | H05B 3/24 |
| | | | 131/194 |
| 5,878,752 A * | 3/1999 | Adams | A24F 40/465 |
| | | | 131/194 |
| 5,934,289 A * | 8/1999 | Watkins | A24F 40/46 |
| | | | 131/194 |
| 5,954,979 A * | 9/1999 | Counts | A24F 40/485 |
| | | | 131/194 |
| 5,969,963 A * | 10/1999 | Ohnishi | H02M 7/483 |
| | | | 363/60 |
| 6,040,560 A * | 3/2000 | Fleischhauer | A24F 40/53 |
| | | | 219/494 |
| 6,054,684 A | 4/2000 | Pas et al. | |
| 6,054,694 A * | 4/2000 | Paustian | H05B 6/686 |
| | | | 219/679 |
| 6,140,799 A * | 10/2000 | Thomasson | B60L 58/19 |
| | | | 320/117 |
| 6,211,498 B1 | 4/2001 | Patridge | |
| 6,239,579 B1 * | 5/2001 | Dunn | H02J 7/0013 |
| | | | 324/426 |
| 6,250,301 B1 * | 6/2001 | Pate | A61M 11/041 |
| | | | 392/397 |
| 6,394,819 B1 | 5/2002 | Mosser, III et al. | |
| 6,396,665 B1 | 5/2002 | Asano | |
| 6,426,282 B1 | 7/2002 | Saigal et al. | |
| 6,483,669 B1 | 11/2002 | Krinke | |
| 6,536,442 B2 * | 3/2003 | St. Charles | A24F 42/60 |
| | | | 131/194 |
| 6,568,390 B2 * | 5/2003 | Nichols | A61M 15/00 |
| | | | 219/486 |
| 6,576,148 B1 | 6/2003 | Shum et al. | |
| 6,615,840 B1 * | 9/2003 | Fournier | A24D 1/02 |
| | | | 131/365 |
| 6,687,103 B2 * | 2/2004 | Pannwitz | H02J 7/00308 |
| | | | 361/90 |
| 6,688,313 B2 * | 2/2004 | Wrenn | A24C 5/606 |
| | | | 131/194 |
| 6,694,975 B2 | 2/2004 | Schuster et al. | |
| 6,717,059 B2 | 4/2004 | Shintani et al. | |
| 6,772,756 B2 * | 8/2004 | Shayan | A24F 40/48 |
| | | | 392/397 |
| 6,803,545 B2 * | 10/2004 | Blake | H05B 3/58 |
| | | | 131/194 |
| 6,883,516 B2 * | 4/2005 | Hindle | A61M 11/042 |
| | | | 128/200.14 |
| 6,944,936 B2 | 9/2005 | Krinke | |
| 7,084,864 B1 * | 8/2006 | Wood | H05B 41/16 |
| | | | 363/59 |
| 7,088,914 B2 | 8/2006 | Whittle et al. | |
| 7,117,867 B2 * | 10/2006 | Cox | A24F 40/60 |
| | | | 128/200.14 |
| 7,167,776 B2 * | 1/2007 | Maharajh | F22B 35/18 |
| | | | 392/394 |
| 7,168,154 B2 | 1/2007 | Tsuchiya et al. | |
| 7,193,390 B2 * | 3/2007 | Nagai | H01M 10/44 |
| | | | 320/103 |
| 7,286,325 B2 | 10/2007 | Hernandez et al. | |
| 7,293,565 B2 * | 11/2007 | Griffin | H02J 7/0044 |
| | | | 131/329 |
| 7,297,045 B2 * | 11/2007 | Pierson | A63H 19/14 |
| | | | 446/25 |
| 7,301,250 B2 * | 11/2007 | Cassel | H03K 3/57 |
| | | | 307/106 |
| 7,331,500 B2 | 2/2008 | Martin et al. | |
| 7,344,060 B2 | 3/2008 | Koh | |
| 7,352,535 B2 | 4/2008 | Arya et al. | |
| 7,365,523 B2 | 4/2008 | Malherbe et al. | |
| 7,401,725 B2 | 7/2008 | Ho et al. | |
| 7,518,830 B1 | 4/2009 | Panchal et al. | |
| 7,535,124 B2 | 5/2009 | Miyazaki | |
| 7,535,196 B2 * | 5/2009 | Nagasawa | H02J 9/061 |
| | | | 320/112 |
| 7,550,876 B2 * | 6/2009 | Cassel | H03K 3/57 |
| | | | 307/108 |
| 7,554,221 B2 * | 6/2009 | Cassel | H03K 3/57 |
| | | | 307/108 |
| 7,629,558 B2 | 12/2009 | Petrenko | |
| 7,745,025 B2 * | 6/2010 | Leach | H02J 7/00308 |
| | | | 320/140 |
| 7,897,055 B2 | 3/2011 | Tu et al. | |
| 8,039,987 B2 | 10/2011 | Sawada | |
| 8,072,709 B2 | 12/2011 | Rothenberg et al. | |
| 8,091,558 B2 * | 1/2012 | Martzel | A24F 40/50 |
| | | | 131/273 |
| 8,173,909 B2 | 5/2012 | Cayaban et al. | |
| 8,333,197 B2 * | 12/2012 | Cross | A61M 15/008 |
| | | | 128/200.14 |
| 8,365,742 B2 * | 2/2013 | Hon | H01M 50/284 |
| | | | 131/194 |
| 8,384,351 B2 * | 2/2013 | Monden | H02J 7/00304 |
| | | | 320/120 |
| 9,128,161 B2 * | 9/2015 | Mizoguchi | B60L 1/00 |
| 2002/0000520 A1 | 1/2002 | Kawaguchi | |
| 2002/0005207 A1 * | 1/2002 | Wrenn | A24D 1/20 |
| | | | 131/194 |
| 2003/0015499 A1 | 1/2003 | Kawamoto et al. | |
| 2003/0018425 A1 | 1/2003 | Gronau et al. | |

(56) References Cited

U.S. PATENT DOCUMENTS

| | | | |
|---|---|---|---|
| 2003/0154991 A1* | 8/2003 | Fournier | A24F 40/50 |
| | | | 131/194 |
| 2003/0189419 A1* | 10/2003 | Maki | G01R 31/396 |
| | | | 320/166 |
| 2003/0226837 A1 | 12/2003 | Blake et al. | |
| 2004/0002050 A1 | 1/2004 | Wagner et al. | |
| 2004/0020500 A1* | 2/2004 | Wrenn | A24C 5/606 |
| | | | 131/194 |
| 2004/0037007 A1 | 2/2004 | Rugg et al. | |
| 2006/0087011 A1 | 4/2006 | Kanagawa et al. | |
| 2006/0103984 A1 | 5/2006 | Shin et al. | |
| 2006/0118128 A1 | 6/2006 | Hoffmann et al. | |
| 2006/0118218 A1 | 6/2006 | Burns et al. | |
| 2006/0158784 A1 | 7/2006 | Arya et al. | |
| 2007/0027332 A1 | 2/2007 | Naidu et al. | |
| 2007/0212103 A1 | 9/2007 | Kikuchi | |
| 2007/0274736 A1* | 11/2007 | Sato | G03G 15/5004 |
| | | | 399/88 |
| 2008/0000316 A1 | 1/2008 | Kurokawa | |
| 2008/0003166 A1* | 1/2008 | Maletin | C01B 32/05 |
| | | | 29/25.03 |
| 2008/0009291 A1 | 1/2008 | Emberson et al. | |
| 2008/0020397 A1 | 1/2008 | Mundorff et al. | |
| 2008/0088978 A1 | 4/2008 | Ho et al. | |
| 2008/0099236 A1 | 5/2008 | Cayaban et al. | |
| 2008/0186623 A1 | 8/2008 | Cayaban et al. | |
| 2008/0203970 A1* | 8/2008 | Shen | H02J 7/0068 |
| | | | 307/65 |
| 2008/0253028 A1 | 10/2008 | Chang et al. | |
| 2008/0277142 A1 | 11/2008 | Kanagawa et al. | |
| 2008/0315829 A1 | 12/2008 | Jones | |
| 2009/0017961 A1 | 1/2009 | Battistella | |
| 2009/0085553 A1* | 4/2009 | Kumar | H01M 10/425 |
| | | | 320/117 |
| 2009/0152954 A1 | 6/2009 | Le et al. | |
| 2009/0179613 A1* | 7/2009 | Masho | H02M 3/1582 |
| | | | 320/167 |
| 2010/0015538 A1 | 1/2010 | Nakamori | |
| 2010/0155388 A1* | 6/2010 | Menassa | H05B 1/0275 |
| | | | 219/491 |
| 2011/0119911 A1 | 5/2011 | Kanagawa et al. | |
| 2013/0031943 A1 | 2/2013 | Ferguson et al. | |
| 2015/0023791 A1 | 1/2015 | Sadi et al. | |
| 2015/0208731 A1 | 7/2015 | Malamud et al. | |
| 2016/0106936 A1 | 4/2016 | Kimmel | |
| 2017/0231276 A1 | 8/2017 | Mironov et al. | |
| 2017/0231282 A1 | 8/2017 | Bowen et al. | |

FOREIGN PATENT DOCUMENTS

| | | | | |
|---|---|---|---|---|
| CN | 1040914 | | 4/1990 | |
| CN | 1060598 A | | 4/1992 | |
| CN | 1040914 A | | 4/1993 | |
| CN | 2129660 Y | | 4/1993 | |
| DE | 2911565 A1 | | 9/1980 | |
| DE | 3028068 A1 | | 4/1981 | |
| DE | 3038069 A1 | | 4/1982 | |
| DE | 243784 C | | 11/1987 | |
| DE | 3640781 A1 | | 8/1988 | |
| DE | 3711234 A1 | | 10/1988 | |
| DE | 3735704 A1 | | 5/1989 | |
| DE | 301092 C | | 1/1992 | |
| DE | DD-301092 A7 | | 10/1992 | |
| EP | 0893071 A1 | | 7/1908 | |
| EP | 0 239 892 A1 | | 10/1987 | |
| EP | 0277519 A2 | | 8/1988 | |
| EP | 0295122 A2 | | 12/1988 | |
| EP | 0358002 A2 | | 3/1990 | |
| EP | 0358114 A2 | | 3/1990 | |
| EP | 0378997 A2 | | 7/1990 | |
| EP | 0430566 A2 | | 6/1991 | |
| EP | 438862 A2 | | 7/1991 | |
| EP | 0449790 A2 | | 10/1991 | |
| EP | 0488488 A1 | | 6/1992 | |
| EP | 0640297 A1 | | 3/1995 | |
| EP | 0857431 A1 | | 8/1998 | |
| EP | 1618803 A1 | | 1/2006 | |
| EP | 1736062 A2 | | 12/2006 | |
| EP | 1736065 A1 | | 12/2006 | |
| EP | 1750788 A1 | | 2/2007 | |
| EP | 02398922 A2 | | 12/2011 | |
| GB | 2132539 A | | 7/1984 | |
| GB | 2148079 A | | 5/1985 | |
| GB | 2148676 A | | 5/1985 | |
| JP | 61-68061 | | 4/1986 | |
| JP | H02124081 A | | 5/1990 | |
| JP | 2-263773 | | 10/1990 | |
| JP | H03232481 A | | 10/1991 | |
| JP | H06315366 A | | 11/1994 | |
| JP | H08168182 A | | 6/1996 | |
| JP | H10285797 A | | 10/1998 | |
| JP | H11150875 A | | 6/1999 | |
| JP | 2001-309642 A | | 11/2001 | |
| JP | 2006505281 A | | 2/2006 | |
| JP | 2006/320286 A | | 11/2006 | |
| JP | 45-28471 B2 | | 8/2010 | |
| KR | 100636287 B1 | | 10/2006 | |
| NO | 893591 L | * | 3/1990 | A61M 15/00 |
| RU | 2085092 C1 | | 7/1997 | |
| RU | 2005115957 A | | 1/2006 | |
| RU | 2306654 C1 | | 9/2007 | |
| RU | 2 336 002 C2 | | 10/2008 | |
| SU | 621141 A1 | | 8/1978 | |
| SU | 864597 A1 | | 9/1981 | |
| WO | WO-86/02528 A1 | | 5/1986 | |
| WO | WO-94/06313 A1 | | 3/1994 | |
| WO | WO-9406314 A1 | | 3/1994 | |
| WO | WO-95/27411 A1 | | 10/1995 | |
| WO | WO-2004/043175 A1 | | 5/2004 | |
| WO | WO-2005120614 A1 | | 12/2005 | |
| WO | WO-2007024130 A1 | | 3/2007 | |
| WO | WO-2007/066374 A1 | | 6/2007 | |
| WO | WO-2007/078273 A1 | | 7/2007 | |
| WO | WO-2007077167 A1 | | 7/2007 | |
| WO | WO-2007/131449 A1 | | 11/2007 | |
| WO | WO-2007/131450 A1 | | 11/2007 | |
| WO | WO-2008015441 A1 | | 2/2008 | |

OTHER PUBLICATIONS

"Joining of Ceramics" by R.E. Loehman et al., published in *Ceramic Bulletin*, 67(2):375-380 (1988).

"Oxidation Behavior of Silver- and Copper-Based Brazing Filler Metals for Silicon Nitride/Metal Joints" by R.R. Kapoor et al., published in *J. Am. Ceram. Soc.*, 72(3):448-454 (1989).

"Brazing Ceramic Oxides to Metals at Low Temperatures" by J.P. Hammond et al., published in *Welding Research Supplement*, 227-232-s (1988).

Brazing of Titanium-Vapor-Coated Silicon Nitride by M.L. Santeiia, published in *Advanced Ceramic Materials*, 3(5): 457-465 (1988).

"Microstructure of Alumina brazed with a Sliver-Copper-Titanium Alloy" by M.L. Santeiia et al., published in *J. Am. Ceram. Soc.* 73(6): 1785-1787 (1990).

Fen et al., "Cyclic oxidation of Haynes 230 alloy", Chapman & Hall, pp. 1514-1520 (1992).

Kutner, "Thermal spray by design", Reprint from Advanced Materials & Processes Incorporating Metal Progress, Oct. (1988).

"Characterizing Thermal Spray Coatings", Article based on presentations made at the Fourth National Thermal Spray Conference, May 4-10, 1991 and appearing in Advanced Materials and Processes, May 1992, pp. 23-27.

Howes, Jr., "Computerized Plasma Control for Applying Medical-Quality Coatings", Industrial Heating, pp. 22-25, Aug. 1993.

V. Sikka, "Processing of Intermetallic Aluminides", Intermetallic Metallurgy and Processing Intermetallic compounds, ed. Stoloff et al., Van Mestrand Reinhold, N.Y., 1944.

Brezovich, "Temperature Distributions in Tumor Models Heater." Mar./Apr. 1984, pp. 145-152.

Gorbachev, "Compensation of Varying Load in a Thyristor." v. 56, No. 3, pp. 27-28.

(56) References Cited

OTHER PUBLICATIONS

Katagiri, "Rapid Reinforcement for Fusion Mass Spliced Fibers Using Low-Power." Jun. 1, 1985, pp. 1708-1712.
Matthes, "Thyristorised Converters for Inductive Heating for Hot Forging." 1975, pp. 80-86.
Stauffer, "Observations on the Use of Ferromagnetic." 1984, pp. 76-90.
Reinshagen and Sikka, "Thermal Spraying of Selected Aluminides", Proceedings of the Fourth National Thermal Spray Conference, Pittsburgh, PP USA, pp. 307-313 (May 4-10, 1991).
Duarte, "A Design Procedure for a Self Oscillating Hybrid Inverter." 1991, pp. 350-355.
Xu, "The High-Frequency Inductive Electric Heater and Its Application." Apr. 1992, pp. 39-42.
English translation of Taiwan Office Action mailed Oct. 27, 2014.
English translation of the Taiwan Notification for the Opinion of Examination mailed Mar. 11, 2014.
Russian Office Action and English translation thereof mailed Nov. 28, 2013.
Russian Search Report mailed May 26, 2016.
Russian Office Action and English translation thereof mailed Mar. 4, 2013.
International Search Report and Written Opinion mailed Jun. 2, 2009.
Korean Office Action and English translation thereof mailed May 27, 2016.
Korean Office Action and English translation thereof mailed Oct. 19, 2015.
Japanese Office Action and English translation thereof mailed Feb. 3, 2016.
Japanese Office Action and English translation thereof mailed Jul. 15, 2015.
Japanese Office Action and English translation thereof mailed Feb. 3, 2014.
Japanese Office Action and English translation thereof mailed Jun. 26, 2013.
Indian Office Action mailed Feb. 11, 2017.
Patent Office of the Cooperation Council for the Arab States of the Gulf Examination Report mailed Sep. 15, 2013.
Patent Office of the Cooperation Council for the Arab States of the Gulf Examination Report mailed Dec. 26, 2013.
Extended European Search Report mailed Aug. 18, 2008.
Chinese Office Action and English translation thereof mailed Jun. 21, 2011.
Canadian Office Action mailed Mar. 30, 2015.
Australian Office Action mailed Dec. 14, 2012.
Taiwanese Office Action dated Mar. 6, 2014, issued by the Taiwanese Patent Office in corresponding Taiwanese Patent Application No. 098107959 (Englishlanguage translation of Office Action) (9 pages).
European Search Report for Application No. 08250885.4-2313, dated Aug. 18, 2008.
"Excerpt from 'NASA Tech Briefs'," Jul./Aug. 1988, p. 31.
"PTC Thermistors" Keystone Carbon Company product literature.
"Oxidation Behavior of Silver- and Cooper-Based Brazing Filler Metals for Silicon Nitride/Metal Joints" by R.R. Kapoor et al., published in J. Am. Ceram. Soc.,, 72(3):448-454 (1989).
Brazing of Titanium-Vapor-Coated Silicon Nitride by M. L. Santella, published in Advanced Ceramic Materials, 3(5):457-465 (1988).
"Microstructure of Alumina brazed with a Sliver—Copper—Titanium Alloy" by M.L. Santella et al., published in J. Am. Ceram. Soc. 73(6): 1785-1787 (1990).
"High Temperature Structural Silicides" by A. K. Vasudevan et al., Elsevier Science Publishers B.V. (1992).
John A. Dean, Lange's handbook of Chemistry, 12th Edition, 1978 pp. 4-16, 4-123.
V. Sikka, "Processing of Intermetallic Aluminides", Intermetallic Metallurgy and Processing Intermetallic compounds, ed. Stoloff et al., Van Mestrand Reinhold, N.Y., 1994.
Gorbachev, "Compensation of Varying Load in a Thyristor." v. 56, No. 3, pp. 27-28, 1985.
Mioduszewski, "Inductive Heating of Spent Granular Activated Carbon." Mar. 1982, pp. 1096.
Staufer, "Observations on the Use of Ferromagnetic." 1984, pp. 76-90.
Indian Notice of Hearing mailed Feb. 10, 2020.

* cited by examiner

ELECTRICALLY HEATED AEROSOL GENERATING SYSTEM AND METHOD

CROSS-REFERENCE TO RELATED APPLICATIONS

This application is a continuation of and claims priority under 35 U.S.C. § 120/121 to U.S. application Ser. No. 17/568,364, filed Jan. 4, 2022, which is a continuation of U.S. application Ser. No. 16/552,394, filed Aug. 27, 2019, which is a continuation of U.S. application Ser. No. 15/234,545, filed Aug. 11, 2016, which is a continuation of U.S. application Ser. No. 12/404,788, filed Mar. 16, 2009, which claims priority under to 35 U.S.C. § 119 to European patent application number 08250885.4, filed on Mar. 14, 2008, the entire contents of each of which are incorporated by reference herein.

BACKGROUND

The present invention relates to an electrically heated aerosol generating system for receiving an aerosol-forming substrate, and a method for electrically heating an aerosol-forming substrate. The present invention finds particular application as an electrically heated smoking system.

A number of prior art documents, for example U.S. Pat. Nos. 5,060,671, 5,388,594, 5,505,214, 5,591,368, WO-A-2004/043175, EP-A-0 358 002, EP-A-0 295 122, EP-A-1 618 803, EP-A-1 736 065 and WO-A-2007/131449, disclose electrically operated smoking systems, having a number of advantages. One advantage is that they significantly reduce sidestream smoke, while permitting the smoker to selectively suspend and reinitiate smoking.

U.S. Pat. No. 5,388,594, the entire contents of which are incorporated herein by this reference thereto, describes an electrical smoking system. The smoking system includes a cigarette and a reusable lighter. The cigarette is adapted to be inserted in and removed from an orifice at a front end of the lighter. The lighter includes a housing and has a front portion and a rear portion. A power source for supplying energy to heating elements for heating the cigarette is disposed in the rear portion of the lighter. The power source is sized to provide sufficient power for the heating elements that heat the cigarette. The power source is preferably replaceable and rechargeable and, in one preferred embodiment, is a battery. The front portion preferably houses heating elements and circuitry in electrical communication with the power source. The smoking system is used in much the same fashion as a conventional cigarette.

WO-A-2004/043175 also describes an electrical smoking system. In that document, the electrically heated cigarette smoking device includes an upper heater case cap, a front housing and left and right battery case portions. A heater unit is positioned below the heater case cap, with the heater unit fitting inside a partition, which positions the heater unit relative to the front housing of the device. An opening at the top of the heater case cap allows for the insertion of a cigarette into the top opening of the heater unit. When the cigarette has been inserted through the heater case cap opening and into the heater unit opening, it is positioned in proximity to a plurality of heater blades, arranged around the circumference of the cigarette. Slots through the heater case cap provide passageways for ambient air to enter the device when a cigarette is positioned in the opening. A printed circuit board is positioned between the partition and the front housing. A heater unit connector is positioned below the heater unit within inner housing members. This provides electrical connection between the heater blades and a power source such as a battery, housed within the battery case portions.

U.S. Pat. No. 5,060,671, the entire contents of which are incorporated herein by this reference thereto, describes a flavor-generating device with a disposable part constituted by the heater and the flavor-generating medium, and a reusable part constituted by the power source.

Other prior art documents, such as EP-A-0 295 122, EP-A-1 618 803 and EP-A-1 736 065, disclose electrical smoking systems which use a liquid as the aerosol-forming substrate. The liquid may be contained in a cartridge which is receivable in a housing. A power supply, such as a battery, is provided, connected to a heater to heat the liquid substrate during a puff, to form the aerosol which is provided to the smoker.

The electrically heated aerosol generating systems of the prior art, including those described above, typically provide a high power pulse to the heater to provide a high temperature and to release the volatile compounds for each puff.

The electrically heated aerosol generating systems of the prior art, including those described above, do have a number of advantages, but there is still room for improvement in the design. It would be advantageous if the devices could be made smaller, so that the size is closer to that of a conventional cigarette and more convenient for the user.

BRIEF SUMMARY OF SOME ASPECTS OF THE INVENTION

It is therefore an object of the invention to provide an improved electrically heated aerosol generating system.

According to a first aspect of the invention there is provided an electrically heated aerosol generating system for receiving an aerosol-forming substrate, the system comprising: at least one heating element for heating the substrate to form the aerosol; and a power supply for supplying power to the at least one heating element, the power supply comprising: a voltage source, two or more (i.e., at least two) supercapacitors, and appropriate switches between the voltage source and the two or more supercapacitors, the switches being arranged such that, during a charging mode, the supercapacitors are connected for charging by the voltage source and, during a heating mode, the supercapacitors are connected for discharging through the at least one heating element.

The invention allows the electrically heated aerosol generating system to be smaller by using supercapacitors which charge up (i.e., store electrical energy) and then discharge (electrical energy) through the at least one heating element.

In one embodiment, the system further comprises voltage step-up or step-down circuitry between the voltage source and the two or more supercapacitors. This is useful if the voltage supplied by the voltage source does not match the maximum voltage across the two or more supercapacitors.

Preferably, the power supply is arranged such that, during the charging mode, the two or more supercapacitors are connected, at least partially, in parallel with each other, and, during the heating mode, the two or more supercapacitors are connected in series with each other. This is advantageous because the voltage supplied by the voltage source need not be the total voltage required across the heating element. This is because the supercapacitors are charged in parallel but discharged in series. In addition, the efficiency of the overall system is increased.

In one embodiment, the system comprises: a portion to be held by a user, and an external charging portion, the portion to be held by a user comprising the at least one heating element, the two or more supercapacitors and at least some of the switches required to connect the two or more supercapacitors during the heating mode, the external charging portion comprising the voltage source and at least some of the switches required to connect the two or more supercapacitors during the charging mode. This embodiment is advantageous because any circuitry required only during charging, and not during heating, can be moved to the external charging portion. This allows the portion to be held by a user to be further reduced in size and weight.

The aerosol-forming substrate preferably comprises a tobacco-containing material containing volatile tobacco flavor compounds which are released from the substrate upon heating. Alternatively, the aerosol-forming substrate may comprise a non-tobacco material such as those used in the devices of EP-A-1 750 788 and EP-A-1 439 876.

Preferably, the aerosol-forming substrate further comprises an aerosol former. Examples of suitable aerosol formers are glycerine and propylene glycol. Additional examples of potentially suitable aerosol formers are described in EP-A-0 277 519 and U.S. Pat. No. 5,396,911.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco. The solid substrate may be in loose form, or may be provided in a suitable container or cartridge. Optionally, the solid substrate may contain additional tobacco or non-tobacco volatile flavor compounds, to be released upon heating of the substrate.

Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, such as those disclosed in U.S. Pat. Nos. 5,505,214, 5,591,368, and 5,388,594, the entire contents of each patent are incorporated herein by this reference thereto, or on its outer surface, or on both its inner and outer surfaces. Such a tubular carrier may be formed of, for example, a paper, or paper like material, a non-woven carbon fiber mat, a low mass open mesh metallic screen, or a perforated metallic foil or any other thermally stable polymer matrix.

The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavor delivery during use.

Alternatively, the carrier may be a non-woven fabric or fiber bundle into which tobacco components have been incorporated, such as that described in EP-A-0 857 431. The non-woven fabric or fiber bundle may comprise, for example, carbon fibers, natural cellulose fibers, or cellulose derivative fibers.

Alternatively, the carrier may be at least a part of the heating element of the electrically heated aerosol generating system. In such cases, the heating element is typically disposable. For example, the solid substrate may be deposited as a thin layer on a metallic foil or on an electrically resistive support as described in U.S. Pat. No. 5,060,671.

The aerosol-forming substrate may alternatively be a liquid substrate. If a liquid substrate is provided, the electrically heated aerosol generating system preferably comprises means for retaining the liquid. For example, the liquid substrate may be retained in a container, such as that described in EP-A-0 893 071. Alternatively or in addition, the liquid substrate may be absorbed into a porous carrier material, as described in WO-A-2007/024130, WO-A-2007/066374, EP-A-1 736 062, WO-A-2007/131449 and WO-A-2007/131450. The porous carrier material may be made from any suitable absorbent plug or body, for example, a foamed metal or plastics material, polypropylene, terylene, nylon fibers or ceramic. The liquid substrate may be retained in the porous carrier material prior to use of the electrically heated aerosol generating system or alternatively, the liquid substrate material may be released into the porous carrier material during, or immediately prior to use. For example, the liquid substrate may be provided in a capsule, as described in WO-A-2007/077167. The shell of the capsule preferably melts upon heating and releases the liquid substrate into the porous carrier material. The capsule may optionally contain a solid in combination with the liquid.

If the aerosol-forming substrate is a liquid substrate, the electrically heated aerosol generating system may further comprise means for heating a small amount of liquid at a time. The means for heating a small amount of liquid at a time may include, for example, a liquid passageway in communication with the liquid substrate, as described in EP-A-0 893 071. The liquid substrate is typically forced into the liquid passageway by capillary force. The heating element is preferably arranged such that during use, only the small amount of liquid substrate within the liquid passageway, and not the liquid within the container, is heated and volatilised.

Alternatively, or in addition, if the aerosol-forming substrate is a liquid substrate, the electrically heated aerosol generating system may further comprise an atomizer in contact with the liquid substrate source and including the at least one heating element. In addition to the heating element, the atomizer may include one or more electromechanical elements such as piezoelectric elements. Additionally or alternatively, the atomizer may also include elements that use electrostatic, electromagnetic or pneumatic effects. The electrically heated aerosol generating system may still further comprise a condensation chamber.

The aerosol-forming substrate may alternatively be any other sort of substrate, for example, a gas substrate, or any combination of the various types of substrate. During operation, the substrate may be completely contained within the electrically heated aerosol generating system. In that case, a user may puff on a mouthpiece of the electrically heated aerosol generating system. Alternatively, during operation, the substrate may be partially contained within the electrically heated aerosol generating system. In that case, the substrate may form part of a separate article and the user may puff directly on the separate article.

The at least one heating element may comprise a single heating element. Alternatively, the at least one heating element may comprise more than one heating element. The heating element or heating elements may be arranged appropriately so as to most effectively heat the aerosol-forming substrate.

The at least one heating element preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics.

Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required. Examples of suitable composite heating elements are disclosed in U.S. Pat. No. 5,498,855, the entire contents of which are incorporated herein by this reference thereto, WO-A-03/095688 and U.S. Pat. No. 5,514,630.

Alternatively, the at least one heating element may comprise an infra-red heating element, a photonic source such as, for example, those described in U.S. Pat. No. 5,934,289, the entire contents of which are incorporated herein by this reference thereto, or an inductive heating element, such as, for example, those described in U.S. Pat. No. 5,613,505, the entire contents of which are incorporated herein by this reference thereto.

The at least one heating element may take any suitable form. For example, the at least one heating element may take the form of a heating blade, such as those described in U.S. Pat. Nos. 5,388,594, 5,591,368, the entire contents of which are incorporated herein by this reference thereto, and U.S. Pat. No. 5,505,214, the entire contents of which are incorporated herein by this reference thereto. Alternatively, the at least one heating element may take the form of a casing or substrate having different electro-conductive portions, as described in EP-A-1 128 741, or an electrically resistive metallic tube, as described in WO-A-2007/066374. Where the aerosol-forming substrate is a liquid provided within a container, the container may incorporate a disposable heating element. Alternatively, one or more heating needles or rods that run through the centre of the aerosol-forming substrate, as described in KR-A-100636287 and JP-A-2006320286, may also be suitable. Alternatively, the at least one heating element may be a disk (end) heater or a combination of a disk heater with heating needles or rods. Other alternatives include a heating wire or filament, for example a Ni—Cr, platinum, tungsten or alloy wire, such as those described in EP-A-1 736 065, or a heating plate. Optionally, the heating element may be deposited in or on a rigid carrier material.

The at least one heating element may comprise a heat sink, or heat reservoir comprising a material capable of absorbing and storing heat and subsequently releasing the heat over time to the aerosol-forming substrate. Suitable heat sinks are described in EP-A-0 857 431, U.S. Patent Application Publication 2006/118128, and WO-A-2008/015441. The heat sink may be formed of any suitable material, such as a suitable metal or ceramic material. Preferably, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fiber, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy.

The heat sink or heat reservoir may be arranged such that it is directly in contact with the aerosol-forming substrate and can transfer the stored heat directly to the substrate, as described in EP-A-0 857 431. Alternatively, the heat stored in the heat sink or heat reservoir may be transferred to the aerosol-forming substrate by means of a heat conductor, such as a metallic tube, as described in WO-A-2008/015441.

The at least one heating element may heat the aerosol-forming substrate by means of conduction. The heating element may be at least partially in contact with the substrate, or the carrier on which the substrate is deposited. Alternatively, the heat from the heating element may be conducted to the substrate by means of a heat conductive element.

Alternatively, the at least one heating element may transfer heat to the incoming ambient air that is drawn through the electrically heated aerosol generating system during use, which in turn heats the aerosol-forming substrate by convection. The ambient air may be heated before passing through the aerosol-forming substrate, as described in WO-A-2007/066374. Alternatively, if the aerosol-forming substrate is a liquid substrate, the ambient air may be first drawn through the substrate and then heated, as described in WO-A-2007/078273.

Preferably, the two or more supercapacitors of the power supply are arranged into two or more groups of supercapacitors, each group comprising one supercapacitor or two or more supercapacitors in series. Preferably during the charging mode, the two or more groups of supercapacitors are connected in parallel with each other and, during the heating mode, the two or more groups of supercapacitors are connected in series with each other. The two or more supercapacitors may comprise two, three, four, five, six or more supercapacitors, or any other appropriate number of supercapacitors. The two or more groups of supercapacitors may comprise two, three, four, five, six or more groups, or any other appropriate number of groups. The appropriate number of supercapacitors may be used in each group, according to the voltage required.

In one embodiment, the system further comprises a sensor to detect air flow indicative of a user taking a puff. The sensor may be an electro-mechanical device. Alternatively, the sensor may be any of: a mechanical device, an optical device, an opto-mechanical device and a micro electro mechanical systems (MEMS) based sensor. In that embodiment, preferably, the sensor is connected to the power supply and the system is arranged to switch the switches into the heating mode, when the sensor senses a user taking a puff. When a puff is detected, a high energy pulse is required at the heating element. The supercapacitors will discharge through the heating element at that time, thereby creating the required high current pulse.

In an alternative embodiment, the system further comprises a manually operable switch, for a user to initiate a puff.

Preferably, one or more of the switches are solid-state switches. Preferably, the one or more solid-state switch is a MOSFET (metal-oxide-semiconductor-field-effect-transistor) switch. Alternatively, the one or more solid-state switch may be any other type of FET (field-effect-transistor) switch. Particularly advantageous are those switches having very low resistance when closed, when compared with the resistance of the heating element.

Preferably, the system further comprises a housing for receiving the aerosol-forming substrate and designed to be grasped by a user.

In one preferred embodiment, the voltage source is a DC voltage source. In one embodiment, the voltage source is a lithium-ion battery. Alternatively, the voltage source may be a nickel-metal-hydride battery or a nickel-cadmium battery. In one preferred embodiment, the two or more supercapacitors are electrochemical double layer supercapacitors. In another preferred embodiment, the two or more supercapacitors are supercapacitors comprising nanoporous material. In an alternative embodiment, the two or more supercapacitors may include a combination of electrochemical double layer supercapacitors and supercapacitors comprising nanoporous material.

Features described in relation to the system of U.S. Pat. No. 5,388,594 or the system of WO-A-2004/043175 may be incorporated into the system of the invention.

According to a second aspect of the invention, there is provided a method of electrically heating an aerosol-forming substrate, the method comprising the steps of: providing at least one heating element for heating the substrate to form the aerosol; providing a power supply for supplying power to the at least one heating element, the power supply comprising a voltage source, two or more supercapacitors, and switches between the voltage source and the two or more supercapacitors; during a charging mode, switching the switches so that the two or more supercapacitors are connected for charging by the voltage source; and during a heating mode, switching the switches so that the supercapacitors are connected for discharging through the at least one heating element.

Preferably, the two or more supercapacitors are arranged into two or more groups of supercapacitors, each group comprising one supercapacitor or two or more supercapacitors in series. Preferably during the charging mode, the two or more groups of supercapacitors are connected in parallel with each other and, during the heating mode, the two or more groups of supercapacitors are connected in series with each other. The appropriate number of supercapacitors may be used in each group, according to the voltage required.

Preferably, one or more of the switches are solid-state switches. Preferably, the or each solid-state switch is a MOSFET (metal-oxide-semiconductor-field-effect-transistor) switch.

Features described in relation to one aspect of the invention may also be applicable to another aspect of the invention.

BRIEF DESCRIPTION OF THE DRAWINGS

The invention will be further described, by way of example only, with reference to the accompanying drawings wherein like reference numerals are applied to like elements and wherein.

DETAILED DESCRIPTION OF THE PREFERRED EMBODIMENTS

As already mentioned, known electrical smoking systems typically use battery packs as the power source. They power both the control electronics and the heater for heating the substrate. In the electrical smoking system described in WO-A-2004/043175, three lithium-ion (Li-ion) cells (approximately 3.7 V each) may be connected in series to provide an 11.1 V battery supply. This high voltage is required in order to provide the necessary power to the heater, particularly for the high power pulse required for each puff.

Although Li-ion cells do have a high energy density, they are not particularly efficient in high power applications, such as electrically heated aerosol generating systems, in which high current dissipation is needed in short bursts. The internal resistance of the three cells causes a significant voltage drop with high current loads. In addition, because the three cells are in series, some additional electronic circuitry is required, in order to ensure that the cells do not exceed the maximum rated voltage. In addition, the three Li-ion cells required means the electrically heated aerosol generating system may be larger than desired.

As already described, the invention provides a new power supply for an electrically heated aerosol generating system, which makes use of supercapacitors. Supercapacitors may also be referred to as ultracapacitors.

Supercapacitors are a particular type of capacitor having a large capacity in a small volume. They have an unusually high energy density when compared with standard capacitors. The most common type of supercapacitor is an electrochemical double layer supercapacitor (referred to as an "EDL supercapacitor"). Instead of using a dielectric as such, an EDL supercapacitor comprises a double layer of conducting material, with the two layers in contact. Although each layer is conducting, the interface between the two layers is insulating. Such an EDL supercapacitor typically provides approximately 2.5 V per cell. However, EDL supercapacitors do tend to have a relatively high internal resistance. On the other hand, a supercapacitor using a nanoporous material instead of the conventional insulating barrier (referred to as a "nanoporous supercapacitor"), for example those made by Nanotecture Limited, may have a voltage of approximately 1.4 V per cell, but have the potential for a small internal resistance. Supercapacitors have the same discharge characteristics as standard capacitors. However, nanoporous supercapacitors tend to maintain the voltage during much of the discharge phase.

Figure 1:
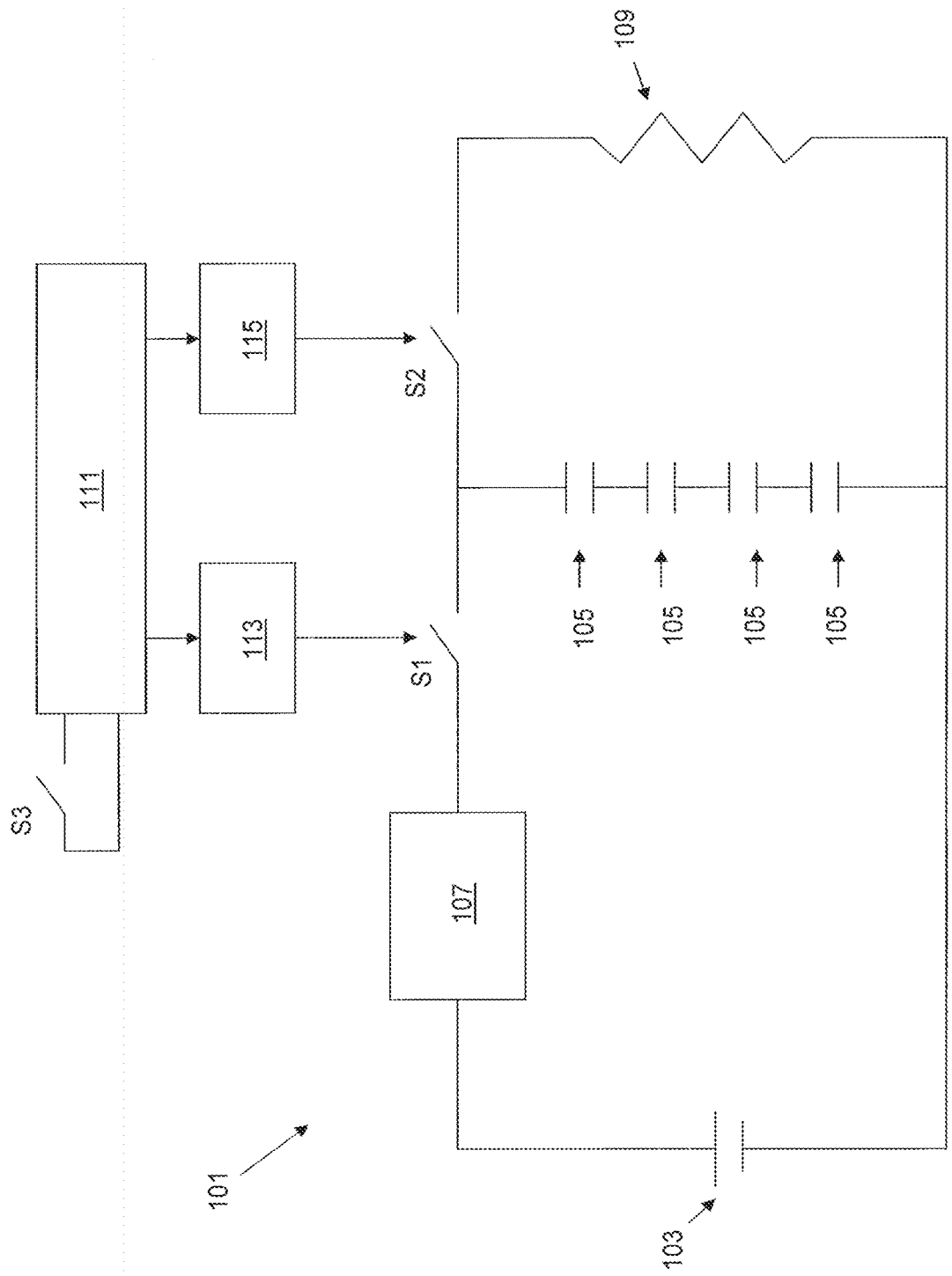
FIG. 1 is a schematic of a first embodiment of a power supply for an electrically heated aerosol generating system.

FIG. 1 shows a first embodiment of a power supply 101 for an electrically heated aerosol generating system. The supply 101 includes a single Li-ion cell 103 providing a voltage of 3.7 V and a group of four EDL supercapacitors 105 (each 2.5 V) in series, forming a stack. Because the voltage across the supercapacitors 105 (10 V in total), is higher than the voltage across the cell 103, voltage step-up circuitry 107 is also required. Also shown in FIG. 1, although not actually part of the power supply itself, is resistor 109 which forms the heating element for heating the substrate. In this embodiment, four EDL supercapacitors of 2.5 V each are used in the stack. However, these could be replaced by seven or eight nanoporous supercapacitors of 1.4 V each.

During charging, a first switch S1 is closed and the supercapacitors 105 are charged. After charging, first S1 may be opened. When the high power pulse is required for the puff, a second switch S2 is closed and first switch S1 remains open. Then, the supercapacitors discharge through the resistor 109, thereby providing the required high current through resistor 109. If a series of high power pulses is required, second switch S2 may be repeatedly closed and opened, allowing a partial discharge for each pulse.

In FIG. 1, first and second switches S1, S2 are under control of a puff detection and control system 111. First switch S1 (for charging the supercapacitors) is controlled by capacitor charge controller 113, and second switch S2 (for discharging the supercapacitors through the resistor) is controlled by energy delivery protocol 115. A third switch S3 is a switch used to initiate a puff. This switch may be a sensor, for sensing a puff, or a manually operable switch.

One of the advantages of the FIG. 1 arrangement is that only a single Li-ion cell 103 is required. This allows the electrically heated aerosol generating system to be considerably reduced in size. However, in the voltage step-up circuitry 107, a large inductor coil is required to match the high current loading needed during charging of the supercapacitors. This compensates for any decrease in size due to there being only one Li-ion cell. In addition, the efficiency of the voltage step-up circuitry is unlikely to be more than 80%.

Figure 2:
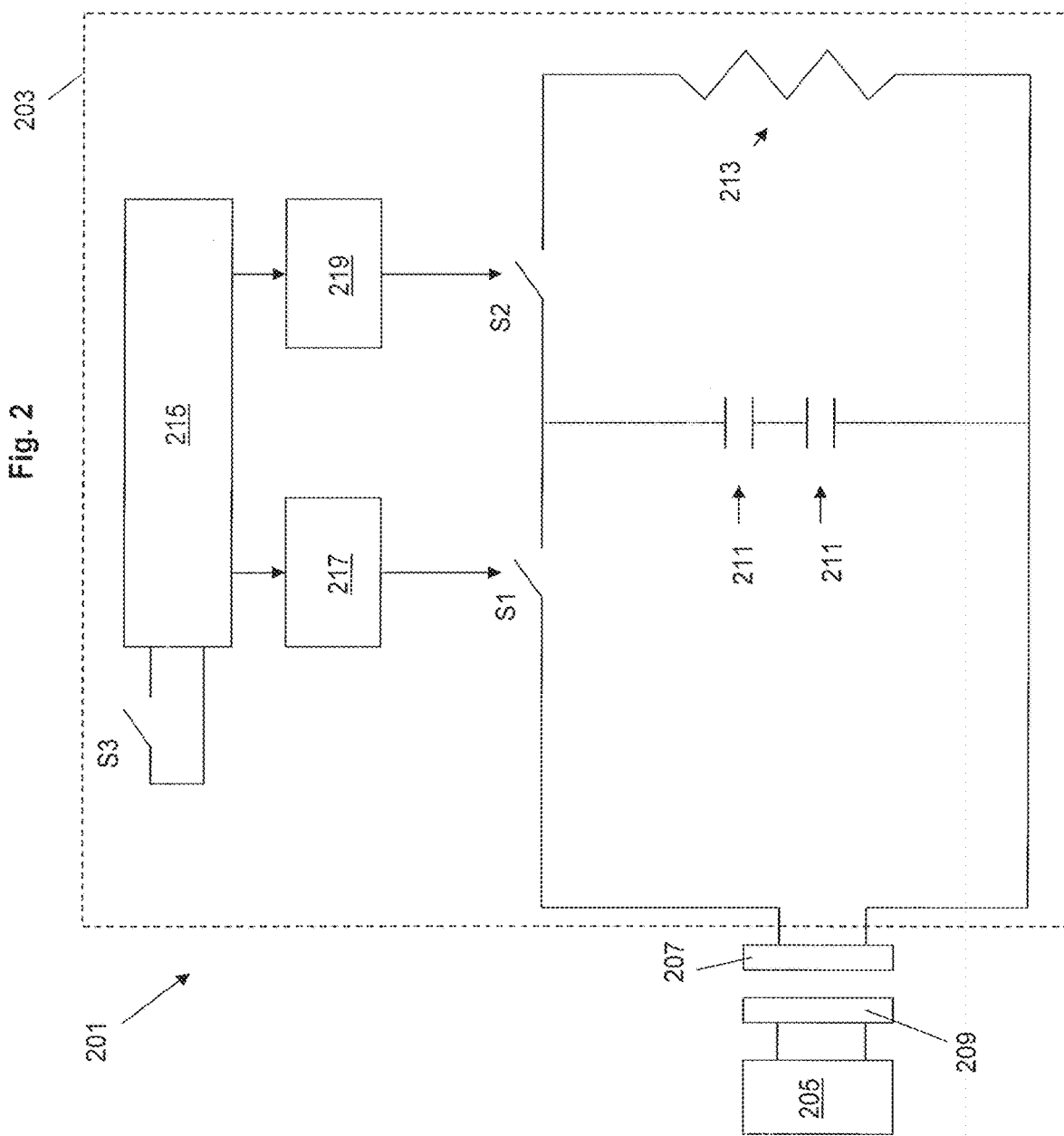
FIG. 2 is a schematic of a second embodiment of a power supply for an electrically heated aerosol generating system.

FIG. 2 shows a second embodiment of a power supply for an electrically heated aerosol generating system. The power supply 201 includes circuitry 203 incorporated into a portion to be held by a user, plus an external DC voltage source 205. The circuitry 203 and voltage source 205 are connected via connectors 207 and 209. In this embodiment, the voltage source 205 provides a voltage of 5V. The circuitry includes a group of two EDL supercapacitors 211 (each 2.5 V) in series (up to 5 V total), forming a stack, and first and second switches S1, S2. Also shown in FIG. 2, although not actually part of the power supply itself, is resistor 213, which forms the heating element. Just as in FIG. 1, first and second switches S1. S2 are under control of a puff detection and control system 215. First switch S1 (for charging the supercapacitors) is controlled by capacitor charge controller 217, and second switch S2 (for discharging the supercapacitors through the resistor) is controlled by energy delivery protocol 219. The third switch S3 is used to initiate a puff and may be a sensor or a manually operable switch.

During charging, connectors 207 and 209 are in electrical contact, first switch S1 is closed and the supercapacitors 211 are charged. When a puff is required, connectors 207 and 209 are disconnected. When a user draws a puff, second switch S2 is closed and first switch S1 is opened. Then, the supercapacitors discharge through the heating element.

In FIG. 2, no voltage step-up circuitry 107 is required. This is because the voltage of the supercapacitors matches that of the DC voltage source 205. One of the advantages of the FIG. 2 arrangement is that the size of the electrically heated aerosol generating system can be reduced because neither a plurality of cells nor voltage step-up circuitry is required. Although FIG. 2 shows circuitry 203 and an external voltage source 205, it is possible for the voltage source to be incorporated into the portion to be held by the user.

Figure 3:
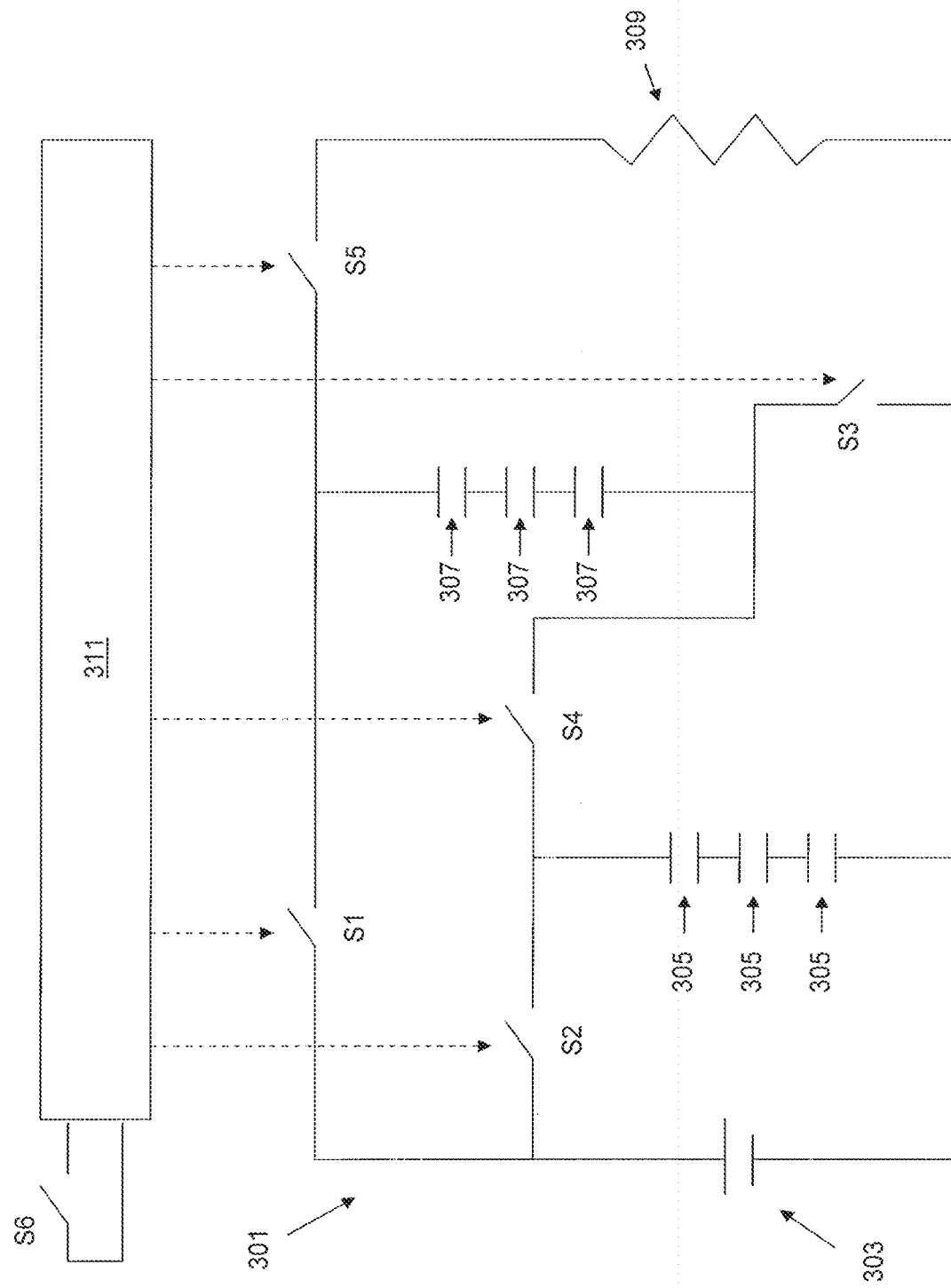
FIG. 3 is a schematic of a third embodiment of a power supply for an electrically heated aerosol generating system.

FIG. 3 shows a third embodiment of a power supply for an electrically heated aerosol generating system. The power supply 301 includes a DC voltage source in the form of a single Li-ion cell 303 providing a voltage of 3.7 V, and two or more supercapacitors formed into a first group of three nanoporous supercapacitors 305 in series (up to 4.2 V in total), forming a first stack, and a second group of three nanoporous supercapacitors 307 in series (also up to 4.2 V in total), forming a second stack. The circuitry also includes a plurality of switches S1 to S5. Also shown in FIG. 3, although not actually part of the power supply itself, is a resistor 309 which forms the heating element for heating the substrate. In this embodiment, three nanoporous supercapacitors of 1.4 V each are used in each stack. However, these could be replaced by two EDL supercapacitors of 2.5 V each. In FIG. 3, switches S1 to S5 are under control of digital controller 311. Switch S6 is a switch used to initiate a puff, and may be a sensor or a manually operable switch.

During charging, switches S4 and S5 are open and switches S1, S2 and S3 are closed. The two supercapacitor stacks 305 and 307 are therefore in parallel. After charging, S1 and S2 may be opened. When the high power pulse is required for the puff, switch S3 is opened and switches S4 and S5 are closed, while switches S1 and S2 remain open. Then, the supercapacitor stacks 305 and 307 are in series, so discharge in series through the resistor 309, thereby providing the required high current through resistor 309. If a series of high power pulses is required, switch S5 may be repeatedly closed and opened, allowing a partial discharge for each pulse. The supercapacitors may be re-charged between puffs. Alternatively, the supercapacitors may be only partially discharged during each pulse, so that a number of puffs can be taken before re-charge is required.

Because the capacitor stacks 305 and 307 are charged in parallel, each capacitor stack only needs to be charged to around the same voltage as that of the Li-ion cell 303 i.e. approximately 3.7 V. However, when the stacks are connected in series for discharging, the voltage across the two stacks is twice that of the Li-ion cell i.e. approximately 7.4 V. So, the required high voltage can be provided for the high power pulse, without the need for voltage step-up circuitry. Each stack could be charged to less than the total cell voltage, if required, and the switches S1 and S2 used to stop the charging at the required voltage. Of course, further stacks could be provided if required, or individual supercapacitors, instead of stacks, could be used if suitable.

In the embodiment illustrated in FIG. 3, all the switches S1 to S5 are MOSFET switches. This type of switch, and indeed other solid-state switches, is advantageous since they have a negligible resistance when closed.

Figure 4:
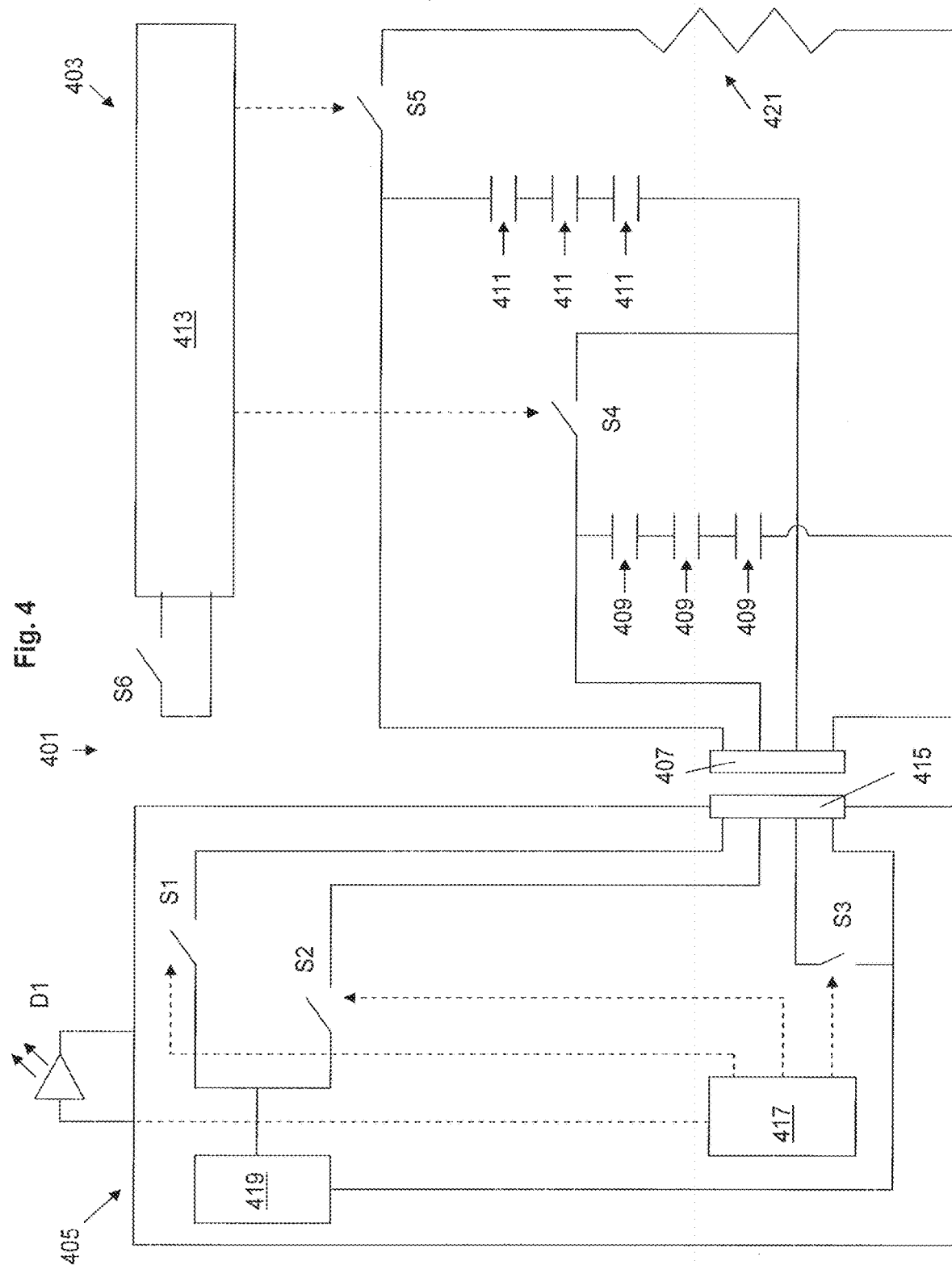
FIG. 4 is a schematic of a fourth embodiment of a power supply for an electrically heated aerosol generating system.

FIG. 4 shows a fourth embodiment of a power supply for an electrically heated aerosol generating system, in which power supply 401 comprises circuitry 403 incorporated into a portion to be held by a user and external charger 405. The circuitry 403 comprises a connector 407 for connection to charger 405, two or more supercapacitors formed into a first group of three nanoporous supercapacitors 409 in series (up to 4.2 V in total), forming a first stack, and a second group of three nanoporous supercapacitors 411 in series (also up to 4.2 V in total) forming a second stack. Circuitry 403 also includes switches S4 and S5, both of which are controlled by digital controller 413. Switch S6 is a switch used to initiate a puff, and may be a sensor or a manually operable switch. Also shown in FIG. 4, although not actually part of the power supply itself, is a resistor 421 which forms the heating element for heating the substrate. The charger 405 comprises a connector 415 for connection to circuitry 403, a charge controller 417, a voltage supply 419 (in this case, 5 V) and switches S1, S2 and S3, under the control of the charge controller 417. The charger 405 also includes a light emitting diode D1, which is switched on when the charger is operating.

Between puffs, the electrically heated aerosol generating system can be charged. So, the system can be connected to a charger and connectors 407 and 415 are then in electrical contact. During that time, switches S1, S2 and S3 are closed and the supercapacitors 409 and 411 are charged in parallel. When a puff is required, the electrically heated aerosol generating system is removed from the charger, so that connectors 407 and 415 are disconnected. When the user draws air through the system, or at another prompt, controller 413 closes switches S4 and S5, allowing the supercapacitors 409 and 411 to discharge in series through heating element 421.

Thus, the arrangement of FIG. 4 makes use of the supercapacitor arrangement of FIG. 3, but allows the system to be reduced even further in size by moving much of the necessary circuitry into the external charger.

The invention could, of course, be used for different voltages simply by varying one or more of: the total number of supercapacitors used, the arrangement of the supercapacitors (either individual or in stacks); the type of supercapacitors; and the supply voltage. In addition, the switches S1 and S2 could be used for voltage monitoring to ensure that the charge voltage does not exceed the maximum rating of the individual supercapacitors. S1 and S2 could also be used to charge the stacks to a lower voltage than the supply voltage.

As described, the invention provides an efficient power supply for an electrically heated aerosol generating system. Supercapacitors provide a number of advantages over batteries, such as their low internal resistance, their high efficiency, their high output power and their low heating levels and consequent safety.

The invention claimed is:

1. A power supply for supplying power to an electrically heated aerosol generating system, the power supply comprising:
    a voltage source;
    at least two supercapacitors;
    a first switch and a second switch between the voltage source and the at least two supercapacitors; and
    a sensor configured to detect airflow in response to a user taking a puff, wherein
        the at least two supercapacitors are connected for charging by the voltage source when the first switch is closed in a charging mode,
        the at least two supercapacitors are connected for discharging when the second switch is closed in a heating mode, and
        the second switch is configured to close and the first switch is configured to open when air flow is detected by the sensor.

2. The power supply of claim 1, further comprising:
    voltage step-up or step-down circuitry between the voltage source and the at least two supercapacitors.

3. The power supply of claim 1, wherein during the charging mode, the at least two supercapacitors are connected in parallel with each other.

4. The power supply of claim 1, wherein during the heating mode, the at least two supercapacitors are connected in series with each other.

5. The power supply of claim 1, wherein the at least two supercapacitors are arranged into at least two groups of supercapacitors, each group comprising one supercapacitor or at least two supercapacitors in series.

6. The power supply of claim 5, wherein during the charging mode, the at least two groups of supercapacitors are connected in parallel with each other.

7. The power supply of claim 5, wherein during the heating mode, the at least two groups of supercapacitors are connected in series with each other.

8. The power supply of claim 1, wherein at least one of the first switch or the second switch is a solid state switch.

9. The power supply of claim 8, wherein the solid state switch is a metal-oxide-semiconductor-field-effect-transistor (MOSFET) switch.

10. The power supply of claim 8, wherein the solid state switch is a field-effect-transistor (FET) switch.

11. The power supply of claim 1, wherein the at least two supercapacitors and the second switch are positioned within a hand-held portion of the electrically heated aerosol generating system.

12. The power supply of claim 1, wherein the voltage source and the first switch are positioned within an external charging portion of the electrically heated aerosol generating system.

13. The power supply of claim 1, wherein the at least two supercapacitors are connected for discharging through at least one heating element of the electrically heated aerosol generating system when the second switch is closed in the heating mode.

* * * * *